United States Patent [19]

Morikawa

[11] Patent Number: 5,222,481
[45] Date of Patent: Jun. 29, 1993

[54] FUEL INJECTION CONTROL SYSTEM FOR AN INTERNAL COMBUSTION ENGINE

[75] Inventor: Koji Morikawa, Tokyo, Japan

[73] Assignee: Fuji Jukogyo Kabushiki Kaisha, Tokyo, Japan

[21] Appl. No.: 901,538

[22] Filed: Jun. 19, 1992

[30] Foreign Application Priority Data

Jun. 26, 1991 [JP] Japan .......................... 3-057168[U]

[51] Int. Cl.$^5$ ............................................. F02M 7/00
[52] U.S. Cl. ..................................... 123/435; 123/434; 123/425
[58] Field of Search ................... 123/435, 434, 425

[56] References Cited

U.S. PATENT DOCUMENTS

| | | | |
|---|---|---|---|
| 4,993,388 | 2/1991 | Mitsumoto | 123/435 |
| 5,078,107 | 1/1992 | Morikawa | 123/435 |
| 5,156,126 | 10/1992 | Obkubo et al. | 123/425 |

FOREIGN PATENT DOCUMENTS 59-221433 12/1984 Japan ................... 123/435

*Primary Examiner*—Raymond A. Nelli
*Attorney, Agent, or Firm*—Martin A. Farber

[57] ABSTRACT

A system for controlling fuel injection for an internal combustion engine has a fuel injector provided for injecting fuel directly in a cylinder, a cylinder pressure detector for detecting pressure in the cylinder at fuel injection, a calculator for producing a correcting coefficient in accordance with a difference between the cylinder pressure and fuel pressure, and a correcting means by multiplying the correcting coefficient to a fuel injection time, thereby changing a fuel injection duration in accordance with a change of the fuel injection timing.

1 Claim, 4 Drawing Sheets

FUEL INJECTION CONTROL SYSTEM FOR AN INTERNAL COMBUSTION ENGINE

BACKGROUND OF THE INVENTION

The present invention relates to a fuel injection control system for an internal combustion engine with a direct fuel injection system, and more particularly to the system for controlling quantity of injected fuel when fuel injection timing is changed.

In a direct fuel injection system for the engine, a fuel injector is provided in a combustion chamber and highly pressurized fuel is directly injected into a cylinder of the engine during a compression stroke and then mixture is ignited by a spark plug. The applicant of the present invention has proposed the fuel injection system in U.S. Pat. No. 5,078,107 as follows. At a heavy engine load, fuel injection is advanced so as to provide a homogeneous charge. In an idling state and a light and middle engine load, the fuel injection is retarded to provide a stratified charge. In the engine, when a combustion mode changes, the quantity of the injected fuel is also changed for controlling engine torque.

In such a fuel injection control system as the direct fuel injection engine, the fuel injection pressure is set higher than a maximum pressure in the cylinder. The fuel injection quantity is determined in accordance with the fuel injection pressure and fuel injection pulse width dependent on the engine operating conditions.

In the engine where the fuel injection timing is changed with the change of the combustion mode, the pressure in the cylinder at the fuel injection timing varies accordingly. As a result, the actual quantity of the injected fuel changes with the cylinder pressure even if the pulse width does not change. Therefore, it is necessary to correct the quantity of the injected fuel so as to coincide with a desired value with accuracy.

Japanese Patent Application Laid-open 59-221433 discloses a fuel injection control system where fuel is injected in an intake manifold and a pressure sensor is provided in a combustion chamber for detecting pressure in the combustion chamber. Based on the detected pressure, the quantity of intake air supplied to the combustion chamber is estimated for calculating the quantity of injected fuel. Thus, an air-fuel ratio is properly controlled at supercharging and in a transient state.

However, in the prior art, fuel injection timing is set to a constant value. Therefore, the quantity of the injected fuel can not be corrected by the prior art at the time when the fuel injection timing changes.

SUMMARY OF THE INVENTION

An object of the present invention is to provide a fuel injection control system for an internal combustion engine with a direct fuel injection system where a quantity of injected fuel is accurately controlled although a fuel injection timing is changed in dependency on a combustion mode.

The system of the present invention has a fuel injector provided for injecting fuel directly in a cylinder, a cylinder pressure detector for detecting pressure in the cylinder at fuel injection, a calculator for producing a correcting coefficient in accordance with a difference between the cylinder pressure and fuel pressure, and a correcting means by multiplying the correcting coefficient to a fuel injection duration. Thus, the fuel injection duration is controlled in accordance with change of the fuel injection timing, which is changed with change of the engine load.

The other objects and features of this invention will become understood from the following description with reference to the accompanying drawings.

DETAILED DESCRIPTION OF THE PREFERRED EMBODIMENT

Figure 1:
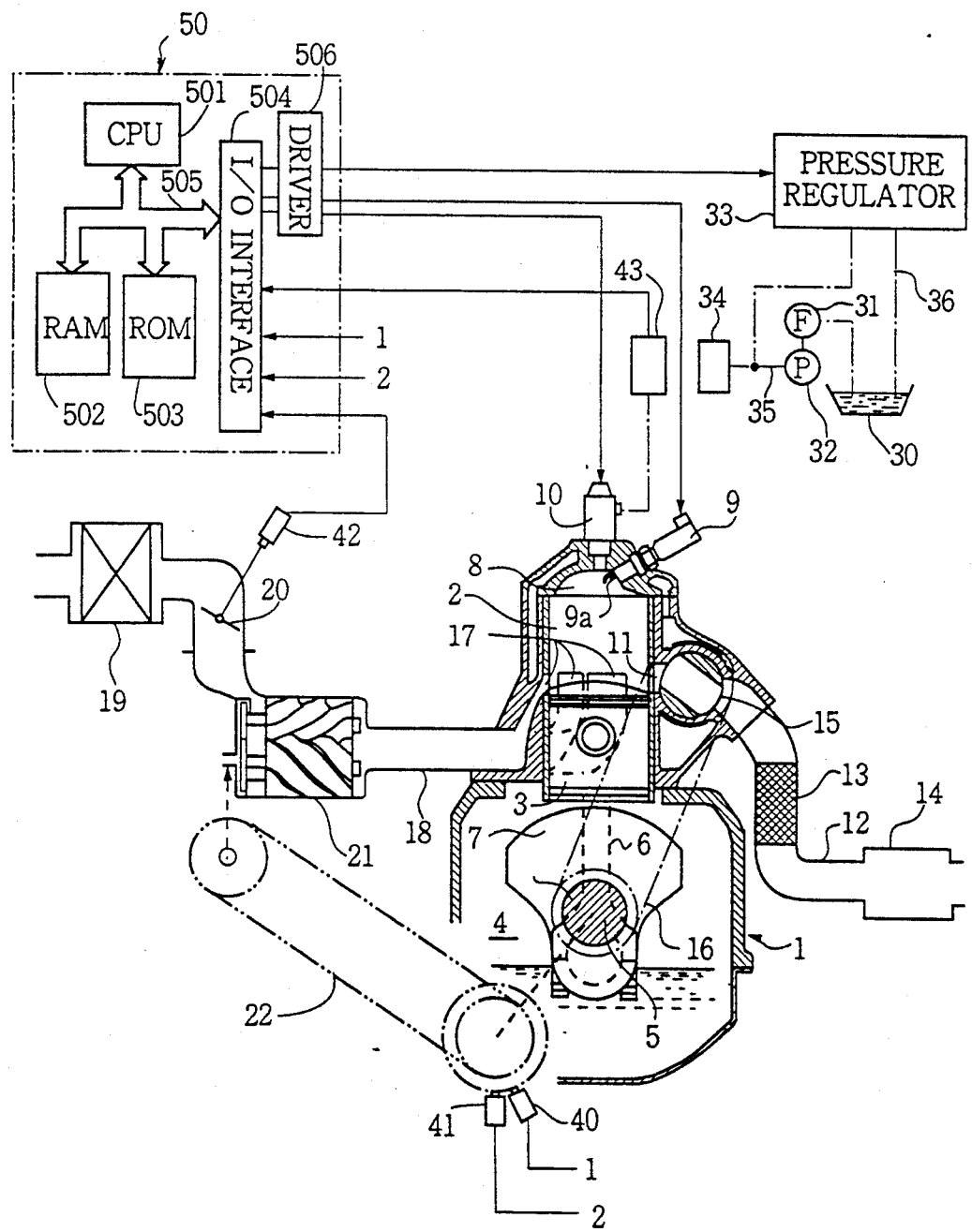
FIG. 1 shows a schematic diagram of a two-cycle engine according to the present invention.

Referring to FIG. 1, a two-cycle engine 1 for a motor vehicle comprises a cylinder 2, a piston 3 provided in the cylinder 2, a connecting rod 6 connected with the piston 3 and a crankshaft 5 disposed in a crankcase 4. A counterweight 7 is mounted on the crankshaft 5 so as to cancel inertia of the piston 3 reciprocating in the cylinder 2. A crank angle sensor and a cylinder discriminating sensor are provided on the engine adjacent to the crank shaft.

In a wall of the cylinder 2, an exhaust port 11 is formed and three scavenge ports 17 are formed, each scavenge port 17 being angularly spaces from each other about 90 degrees and one of them opposing the exhaust port 11. The scavenge ports 17 are connected to branches of an intake pipe 18. The ports 11 and 17 are adapted to open at a predetermined timing with respect to the position of the piston 3.

A fuel injector 10 and a spark plug 9 are provided on a top of a combustion chamber 8 of the cylinder 2.

The combustion chamber 8 may be of an offset, wedge or hemispheric type. The injector 10 is a type where a predetermined amount of fuel is injected at a high pressure through a fuel injection system. The spark plug 9 is so inclined as to position an electrode 9a thereof directly under the injector 10. The distance between the injector 10 and the plug gap 9a is determined based on the condition of the injected fuel having a shape of a cone, which is injected immediately before the ignition in light and middle engine load ranges. That is to say, if the distance is too short, the fuel is insufficiently atomized. To the contrary, the distance is too long, and then the fuel spray is dispersed. By appropriately adjusting the distance, it becomes possible to provide a stratified charge wherein the conical fuel spray is ignited at a rear portion of the spray.

Moreover, the fuel injector 10 is positioned substantially on the vertical center line of the cylinder 2. Hence a large quantity of fuel, which is injected at earlier timing in a heavy engine load range, is quickly diffused to achieve homogeneous air-fuel mixture.

An electronic control unit 50 having a microcomputer comprises a CPU (central processing unit) 501, a ROM 502, a RAM 503, and an I/O (input/output) interface 504, which are connected to each other through a bus line 505.

The crank angle sensor 40, the cylinder discriminating sensor 41, an accelerator pedal depressing sensor 42 and a fuel pressure sensor 43 are connected to the I/0 interface 504. Output signals of the sensors 40, 41, 42, 43 are applied to an input port of the I/0 interface 504. An output port of the I/0 interface 504 is connected to the driver 506. The driver 506 is connected to the pressure regulator 33, the spark plug 9 and the injector 10.

Control programs and fixed data are stored in the ROM 502. Output signals of the sensors 40, 41, 42, 43 are stored in the RAM 503. The RAM 503 stores the output signals after processing data in the CPU 501.

CPU 501 calculates the quantity of the injected fuel, the fuel injection timing and an ignition timing in accordance with the control programs in the ROM 502 and based on various data in the RAM 503.

Fuel in a fuel tank 30 is supplied to the injector 10 through a fuel passage 35 having a filter 31, a pump 32, the fuel pressure sensor 43 and an accumulator 34 for regulating a fluctuation of the fuel pressure. The fuel returns to the tank 30 through a return passage 35 having a pressure regulator 33. The pressure regulator 33 is applied with a signal from the control unit 50 to control the pressure of fuel. Namely, in a light engine load range, where quantity of air charged into the cylinder 2 is small, the fuel is injected at a low pressure. The fuel pressure increases with an increase of the air quantity as the engine load rises. Consequently, in the present invention, the fuel pressure is determined higher than the compressed pressure in the cylinder by a predetermined value in various operating conditions. The fuel injector is opened in accordance with an injecting signal from the control unit 50 to directly inject fuel in the cylinder.

The engine 1 is supplied with air through an air cleaner 19, the intake pipe 18 having a throttle valve 20 with the accelerator pedal depressing sensor 42 and a scavenge pump 21. Exhaust gas of the engine 1 is discharged through the exhaust port 11, an exhaust pipe 12 having a catalytic converter 13, and a muffler 14.

The scavenge pump 21 is operatively connected to the crankshaft 5 through a transmitting device 22 comprising an endless belt running over a crank pulley and a pump pulley. The scavenge pump 21 is driven by the crankshaft 5 through the transmitting device 22 for producing a scavenge pressure. The throttle valve 20 is adapted to slightly open the passage of the intake pipe 18 even when an accelerator pedal operatively connected to the throttle valve 20 is released, thus allowing the scavenge pump 21 to induce air. When the accelerator pedal is depressed, the throttle valve 20 is opened accordingly, thereby controlling the induced air quantity. Hence scavenge pressure generated only by the intake air is supplied to the cylinder 2 for scavenging, so that charging efficiency is increased.

A rotary exhaust valve 15 is provided in the exhaust pipe 12 downstream of the exhaust port 11 adjacent thereto. The rotary valve 15 is operatively connected with the crankshaft 5 through a transmitting device 16 comprising an endless belt running over a crank pulley and a valve pulley so as to be driven by the engine. The rotary valve 15 is adapted to change the valve phase thereof in accordance with the position of the piston 3. When the piston 3 rises during the compression, the exhaust port 11 is closed by the rotary valve 15 at an early stage. Hence it is possible to advance the fuel injection timing, thereby sufficiently mixing the fuel with air in the heavy engine load range.

Figure 2:
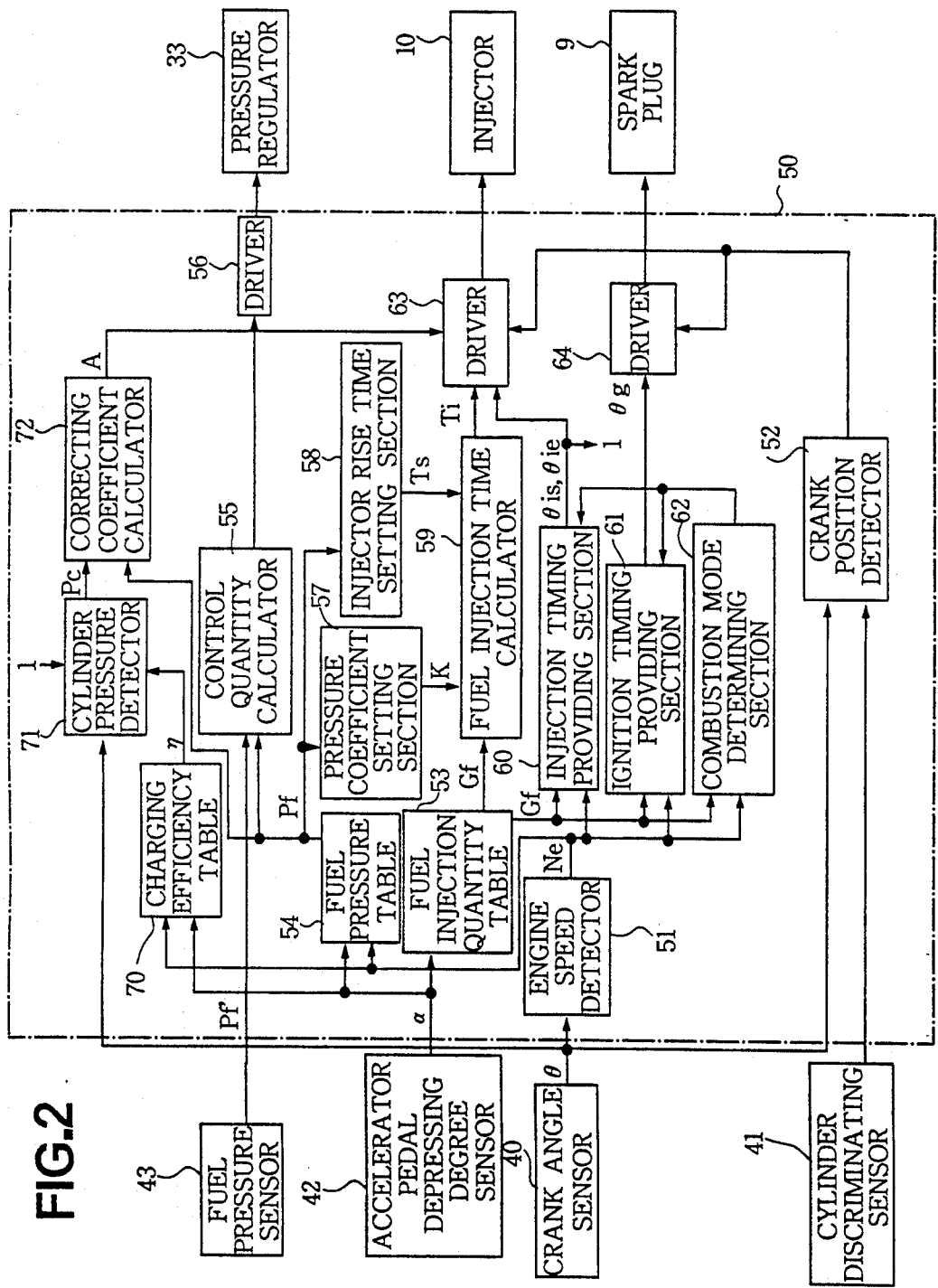
FIG. 2 shows a functional block diagram showing a control unit according to the present invention.

Referring to FIG. 2, the control system of the present invention has a crank angle sensor 40, a cylinder discriminating sensor 41, an accelerator pedal depressing degree sensor 42 for detecting a depressing degree α of the accelerator pedal, and a fuel pressure sensor 43 for detecting fuel pressure Pf, the output signals of which are fed to the control unit 50. The cylinder discriminating sensor 41 detects a cylinder number and produces a cylinder number signal.

The control unit 50 has an engine speed detector 51 to which a crank angle θ from the crank angle sensor 40 is fed to detect an engine speed Ne based on the time interval between crank pulses. The crank angle θ and the cylinder number signal from the cylinder discriminating sensor 41 are applied to a crank position detector 52. The crank position detector 52 is designed to detect a predetermined standard crank angle position before the top dead center in each cylinder.

The engine speed Ne and the accelerator pedal depressing degree α are fed to a fuel injection quantity table 53. The table 53 stores fuel injection quantities Gf dependent on the engine operating conditions.

The engine speed Ne and the accelerator pedal depressing degree α are further applied to a fuel pressure table 54. The table 54 stores desired fuel pressures Pf. The desired pressure Pf corresponding to various engine operating conditions is determined higher than the maximum value of the compressed pressure. The desired pressure Pf is applied to a control quantity calculator 55 to which the fuel pressure Pf from the sensor 43 is applied. The calculator 55 calculates a control quantity in accordance with the difference between the desired pressure Pf and the actual pressure Pf' and produces a pressure signal corresponding to the control quantity which is applied to the pressure regulator 33 through a driver 56.

The desired fuel pressure Pf is further applied to a pressure coefficient setting section 57 and an injector rise time setting section 58, respectively. The section 57 derives a fuel pressure coefficient K from a look-up table, interpolating if necessary. The section 58 derives an injector rise time Ts from the look-up table. The pressure coefficient K and the injector rise time Ts are applied to the fuel injection time calculator 59 to which the fuel injection quantity Gf from the table 53 is applied. The calculator 59 calculates a fuel injection time (pulse width) Ti in dependency on $$Ti = K \cdot Gf + Ts$$

The engine speed Ne and the fuel injection quantity Gf are applied to a combustion mode determining section 62 which determines one of combustion modes, that is the stratified charge combustion and the homogenous charge combustion. The section 62 has a look-up table of a changing point for changing the combustion mode in accordance with the engine speed Ne and the quantity Gf.

The combustion mode determining section 62 compares the fuel injection quantity Gf retrieved in the fuel injection pulse width calculator 53 with a reference quantity Gf0 corresponding to the changing point. In the light and middle engine load range, where the fuel injection quantity Gf is smaller than the reference quantity Gf0 (Gf<Gf0), the stratified charge combustion is determined. In the heavy engine load range, where fuel injection quantity Gf exceeds the reference quantity Gf0 (Gf≧Gf0), the homogeneous charge combustion is determined.

The output signal of the combustion mode determining section 62 is fed to an injection timing providing section 60 to which the engine speed Ne and the fuel injection quantity Gf are also applied. The injection timing providing section 60 has a look-up table storing a plurality of fuel injection timings θie for the stratified charge combustion and a look-up table storing a plurality of fuel injection timings θ is for the homogeneous charge combustion, each arranged in accordance with the engine speed Ne and fuel injection quantity Gf. The timings θ ie is retarded in order to perform the stratified charge combustion. However, the fuel injection must end so as to provide a time during which the injected fuel is atomized before the ignition. To the contrary, the timings θ is for the homogeneous charge combustion are advanced so as to start the injection as soon as the exhaust valve is closed. The output signal of the combustion mode determining section 62, engine speed Ne and the fuel injection quantity Gf are further fed to an ignition timing providing section 61. The ignition timing providing section 61 has ignition timing look-up tables for the stratified charge combustion and the homogeneous charge combustion, each storing a plurality of ignition timings θ g arranged in accordance with the engine speed Ne and fuel injection quantity Gf. The providing section 61 derives the ignition timing θ g from the table in accordance with the engine load.

The fuel injection pulse width Ti calculated by the fuel injection pulse width calculator 59 and the injection timing θ ie or θ is are applied to a driver 63. The driver 63 produces a fuel injection signal corresponding to the fuel injection pulse width Ti and the injection timing θ ie or θ is in dependency on the standard crank angle position from the crank position detector 52. The fuel injection signal is fed to the injector 10.

The ignition timing θ g provided in the ignition timing providing section 61 is fed to a driver 64 which applies an ignition signal corresponding to the ignition timing θ g based on the standard crank angle position and a dwell angle to the spark plug 9.

The control system for correcting the quantity of the injected fuel in dependency on the change of the fuel injection timing will be described. First, describing the principle of the control, when the fuel injection timing θ ie or θ is is changed in dependency on the combustion mode, an actual inner pressure Pc of the cylinder is detected. In accordance with the difference between the actual cylinder pressure Pc and the desired fuel pressure Pf, the fuel injection time Ti is corrected.

Figure 3:
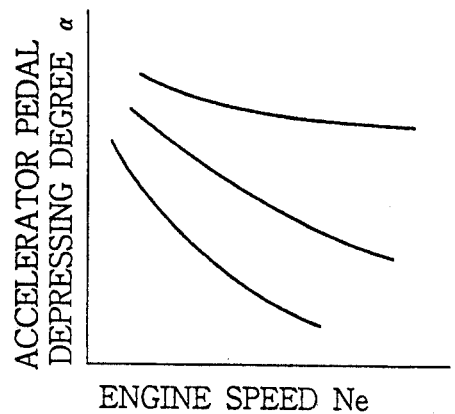
FIG. 3a is a map showing charging efficiency.
FIG. 3b is a map showing rising curves of cylinder pressure.
FIG. 3c is a map showing correcting coefficient.
Figure 3:
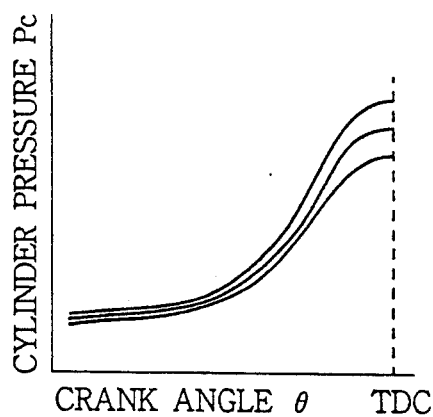
Figure 3:
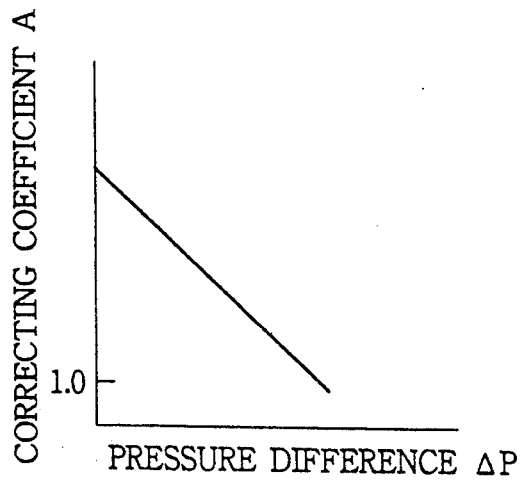

The control unit 50 is provided with a charging efficiency table 70 which is applied with the engine speed Ne and the accelerator pedal depressing degree α. The table 70 stores charging efficiencies η as shown in FIG. 3a in accordance with the various engine operating conditions. The charging efficiency η, a crank angle θ from the sensor 40, and the fuel injection timing θ ie or θ is from the section 60 are applied to a cylinder pressure detector 71. The detector 71 has a look-up table storing a rising curve of the cylinder pressure at each of charging efficiency η at the crank angle θ as shown in FIG. 3b. The detector 71 derives the actual cylinder pressure Pc corresponding to the ignition timing from the look-up table. The cylinder pressure Pc and the fuel pressure Pf of the table 54 are applied to a correcting coefficient calculator 72. The calculator 72 calculates the pressure difference ΔP between the fuel pressure Pf and the cylinder pressure Pc(Pf−Pc) for determining a correcting coefficient A corresponding to the difference ΔP. If the cylinder pressure Pc is small, the difference ΔP becomes large, so that the quantity of the injected fuel is increased. In order to correct the quantity, the correcting coefficient A is determined as a decreasing function of the difference ΔP as shown in FIG. 3c. The correcting coefficient A is fed to the driver 63 in which the fuel injection time Ti is multiplied by the correcting coefficient A.

The operation of the two-cycle engine is described hereinafter. During the operation of the engine 1, the piston 3 reaches a position close to the bottom dead center as shown in FIG. 1, so that the scavenge ports 17 open as well as the exhaust port 11. The intake air, quantity of which depends on the opening degree of the throttle valve 20 operated in accordance with the accelerator pedal, is delivered by the scavenge pump 21 into the cylinder 2 through the scavenge ports 17. Consequently, burned gas in the cylinder 2 is scavenged by vertically swirling air so that fresh intake air is admitted at a high charging efficiency. During the compression, the piston 3 rises from the bottom dead center, closing the scavenge ports 17. At the same time, the exhaust port 11 is closed by the rotary valve 15. The fuel is injected from the injector 10 without the fuel escaping through the exhaust port 11. The pressure of fuel is controlled by the fuel pressure regulator 33 in accordance with the signal from the control unit 50.

Meanwhile in the control unit 50, the fuel injection quantity Gf and the fuel pressure Pf are derived from the look-up tables in accordance with the engine speed Ne and the accelerator pedal depressing degree α. In accordance with the fuel pressure Pf, the pressure coefficient K and the injector rise time Ts are determined. The fuel injection time calculator 59 calculates the fuel injection time Ti based on the fuel injection quantity Gf, the pressure coefficient K and the rise time Ts. The combustion mode determining section 62 determines the combustion mode in accordance with the fuel injection quantity Gf, thereby providing the injection timing and the ignition timing from the injection timing providing section 60 and the ignition timing providing section 61, respectively.

In the light and middle engine load ranges, the look-up table for the stratified charge combustion is selected in the injection timing providing section 60 so that the fuel is injected at the fuel injection time Ti and the injection timing θ ie which is near to the ignition timing θ g close to the top dead center. Consequently, a relatively small quantity of fuel is injected toward the electrode 9a of the spark plug 9 at the latter period of the compression. Immediately after the injection, the ignition signal is applied to the spark plug 9. As a result, the cone shaped fuel spray is ignited at a rear end portion thereof before the fuel is dispersed, thereby achieving the stratified charge combustion. Hence, although the quantity of fuel is small in proportion to the quantity of intake air, the enriched batch of the air-fuel mixture is properly burned to provide a stable combustion.

In the heavy engine load range, the fuel injection quantity Gf is increased so that the homogeneous charge combustion mode is determined. The injection timing look-up table for the homogenous charge combustion is selected in the injection timing providing section 60 to derive the fuel injection timing θ is. The ignition timing θ g is similarly derived from the table in the ignition timing providing section 61. Therefore, a large quantity of the fuel is injected from the injector 10 into the cylinder 2 as soon as the rotary valve 15 closes the exhaust port 11. The fuel is sufficiently mixed with the intake air during the compression so that, when the spark plug 9 is ignited, the fuel is homogenously burned.

Hence the engine torque is increased, owing to the high air mixing effect.

Figure 4:
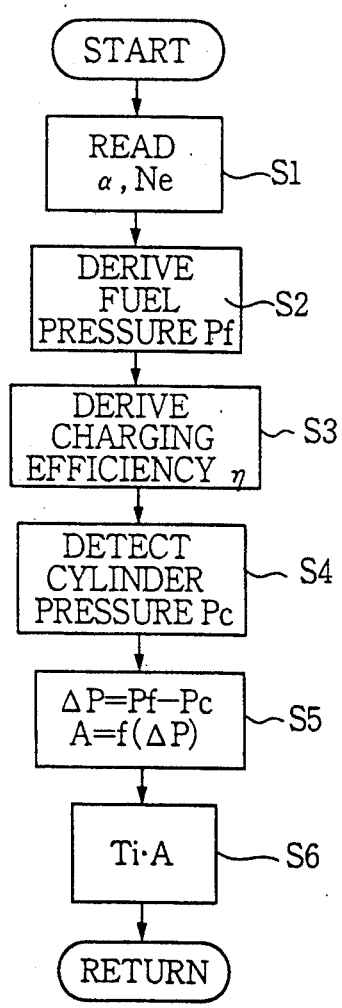
FIG. 4 is a flowchart showing an operation for correcting the quantity of injected fuel.

The operation of the system for correcting the quantity of injected fuel is described with reference to the flowchart of FIG. 4. The engine speed Ne and the accelerator pedal depressing degree α are read at a step S1. At a step S2, the fuel pressure Pf is derived in accordance with the engine operating conditions. At a step S3, the charging efficiency η of the intake air is derived in accordance with the engine operating conditions. At a step S4, the cylinder pressure Pc at the fuel injection timing $\theta$ ie or $\theta$ is is detected in accordance with the cylinder pressure at every charging efficiencies η. If the injection timing $\theta$ is for the homogeneous charge combustion is selected, a low cylinder pressure Pc is detected. At a step S5, the difference ΔP between the fuel pressure Pf and the cylinder pressure Pc is calculated for determining the correcting coefficient A. In the homogeneous charge combustion, the difference ΔP is large because of the low cylinder pressure Pc. Thus, the small correcting coefficient A is set. At a step S6, the fuel injection time Ti is corrected by the correcting coefficient A. In the aforementioned case, the injection time Ti is corrected by the small correcting coefficient A to reduce the time, thereby preventing the quantity of injected fuel from increasing. Consequently, the quantity of fuel injected from the injector 10 under the conditions of the high fuel pressure Pf, the low cylinder pressure Pc, and injection time Ti coincides with the fuel injection quantity Gf obtained by the control unit 50.

If the injection timing $\theta$ ie for the stratified charge combustion is selected, a comparatively high cylinder pressure Pc is detected. Thus, the pressure difference ΔP becomes large to set a large correcting coefficient A. The fuel injection time Ti is corrected by the large correcting coefficient A. Consequently, the quantity of the fuel injected from the injector is corrected in the same manner to coincide with the injection quantity Gf.

In accordance with the present invention, the fuel injection timing is changed in dependency on the combustion mode and the fuel injection time is corrected in consideration of the actual cylinder pressure in the respective injection timings. Thus, the difference of the fuel quantity caused by the cylinder pressure change is corrected. It is possible to accurately control the injected fuel quantity, thereby improving fuel consumption, driveability, and emission control. Since the correcting coefficient is determined in accordance with the difference between the fuel pressure and the cylinder pressure in the changed injection timing, the quantity of fuel is properly corrected.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A fuel injection control system for an internal combustion engine, having a crankshaft, a cylinder with an injector and a spark plug, a pressure regulator for controlling a fuel pressure of said injector, an engine speed sensor for detecting an engine speed from a crank angle of said crankshaft and for generating an engine speed signal, a cylinder discriminator for detecting a cylinder number at a combustion stroke and for producing a cylinder number signal, an accelerator pedal depressing degree sensor for detecting an depressing degree of an accelerator pedal and for generating a degree signal, and a fuel pressure sensor for detecting the fuel pressure and for generating a fuel pressure signal, an improvement of the system which comprises:

charging efficiency retrieving means responsive to said degree signal and said engine speed signal for retrieving a charging efficiency from a table storing a standard charging efficiency in accordance with said engine speed and said depression degree of the accelerator pedal and for generating a charging efficiency signal;

fuel pressure detecting means for detecting the fuel pressure and for generating a fuel pressure signal;

fuel quantity retrieving means responsive to said degree signal for retrieving a fuel quantity from a table storing a standard fuel quantity in accordance with said opening degree of an accelerator pedal and for generating a fuel quantity signal;

timing setting means responsive to said engine speed signal and said fuel quantity signal for deciding a fuel injection timing and for generating a timing signal;

discriminating means responsive to said engine speed signal and said cylinder number signal for detecting a rotational angle and for generating a crank position signal;

cylinder pressure detecting means for detecting an internal pressure in said cylinder and for producing a cylinder pressure signal;

coefficient calculating means responsive to said cylinder pressure signal and said fuel pressure signal for calculating a coefficient and for generating a coefficient signal;

fuel pressure control means responsive to said cylinder pressure signal and said fuel pressure signal for calculating a control amount of fuel and for controlling said pressure regulator; and fuel injection timing control means responsive to said fuel pressure signal, said fuel quantity signal, said timing signal, and said crank position signal for correcting said fuel injection timing in dependency on a variation of said cylinder pressure in said cylinder so as to precisely control said fuel injector.

* * * * *